(12) United States Patent
Uchiyama

(10) Patent No.: US 9,641,527 B2
(45) Date of Patent: May 2, 2017

(54) APPARATUS, METHOD, AND RECORDING MEDIUM OF INFORMATION PROCESSING

(71) Applicant: Hiroaki Uchiyama, Kanagawa (JP)

(72) Inventor: Hiroaki Uchiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 56 days.

(21) Appl. No.: 14/619,482

(22) Filed: Feb. 11, 2015

(65) Prior Publication Data
US 2015/0229515 A1    Aug. 13, 2015

(30) Foreign Application Priority Data

Feb. 13, 2014   (JP) .................................. 2014-025822

(51) Int. Cl.
| | | |
|---|---|---|
| H04L 12/24 | (2006.01) | |
| H04L 29/06 | (2006.01) | |
| H04L 29/08 | (2006.01) | |

(52) U.S. Cl.
CPC .......... *H04L 63/0876* (2013.01); *H04L 41/20* (2013.01); *H04L 41/22* (2013.01); *H04L 41/28* (2013.01); *H04L 67/10* (2013.01); *H04L 67/34* (2013.01); *H04L 63/0853* (2013.01)

(58) Field of Classification Search
None
See application file for complete search history.

(56) References Cited

U.S. PATENT DOCUMENTS

| | | | |
|---|---|---|---|
| 8,773,681 B2 | 7/2014 | Kamasuka | |
| 2004/0187038 A1 | 9/2004 | Yachida | |
| 2004/0193868 A1* | 9/2004 | Kuo ...................... | G06F 3/0238 713/2 |
| 2004/0215949 A1* | 10/2004 | Dennis .................. | G06F 9/4408 713/1 |
| 2004/0236997 A1* | 11/2004 | Poo ....................... | G06F 9/4406 714/36 |
| 2006/0099991 A1* | 5/2006 | Bajikar .................. | G06F 21/57 455/558 |
| 2007/0101113 A1* | 5/2007 | Evans .................... | G06F 9/4406 713/1 |
| 2008/0163381 A1* | 7/2008 | Inaba ..................... | G06F 21/31 726/28 |
| 2010/0131652 A1* | 5/2010 | Brewis ................. | H04L 41/0879 709/227 |
| 2010/0191947 A1* | 7/2010 | Shin ....................... | G06F 21/575 713/2 |
| 2011/0086670 A1* | 4/2011 | Shin ....................... | H04W 8/205 455/558 |
| 2013/0065563 A1* | 3/2013 | Pan ....................... | H04M 1/2745 455/414.1 |

(Continued)

*Primary Examiner* — Peter Poltorak
(74) *Attorney, Agent, or Firm* — Oblon, McClelland, Maier & Neustadt, L.L.P.

(57) ABSTRACT

An information processing apparatus, method, and recording medium. The information processing apparatus includes processing circuitry that starts second software stored in a second medium to execute a second maintenance program when a type of a first medium is a maintenance type, and starts a first software stored in the first medium to execute a first maintenance program when the type of the first medium is not the maintenance type, the processing circuitry does not start the second software when the type of the first medium is not the maintenance type.

9 Claims, 8 Drawing Sheets

(56) References Cited

U.S. PATENT DOCUMENTS

| | | | | |
|---|---|---|---|---|
| 2013/0137481 A1* | 5/2013 | Kim | ...................... | H04W 88/06 |
| | | | | 455/552.1 |
| 2013/0305335 A1* | 11/2013 | Syed | .................. | G06Q 20/4016 |
| | | | | 726/7 |
| 2014/0071225 A1 | 3/2014 | Uchiyama et al. | | |
| 2014/0359483 A1* | 12/2014 | Forutanpour | ........... | H04L 67/10 |
| | | | | 715/753 |
| 2014/0375753 A1* | 12/2014 | Uchiyama | ................ | H04N 7/15 |
| | | | | 348/14.08 |
| 2015/0095433 A1* | 4/2015 | Grossman | ............. | H04L 51/066 |
| | | | | 709/206 |
| 2016/0116974 A1* | 4/2016 | Ginnela | ................ | G06F 1/3293 |
| | | | | 713/2 |

* cited by examiner

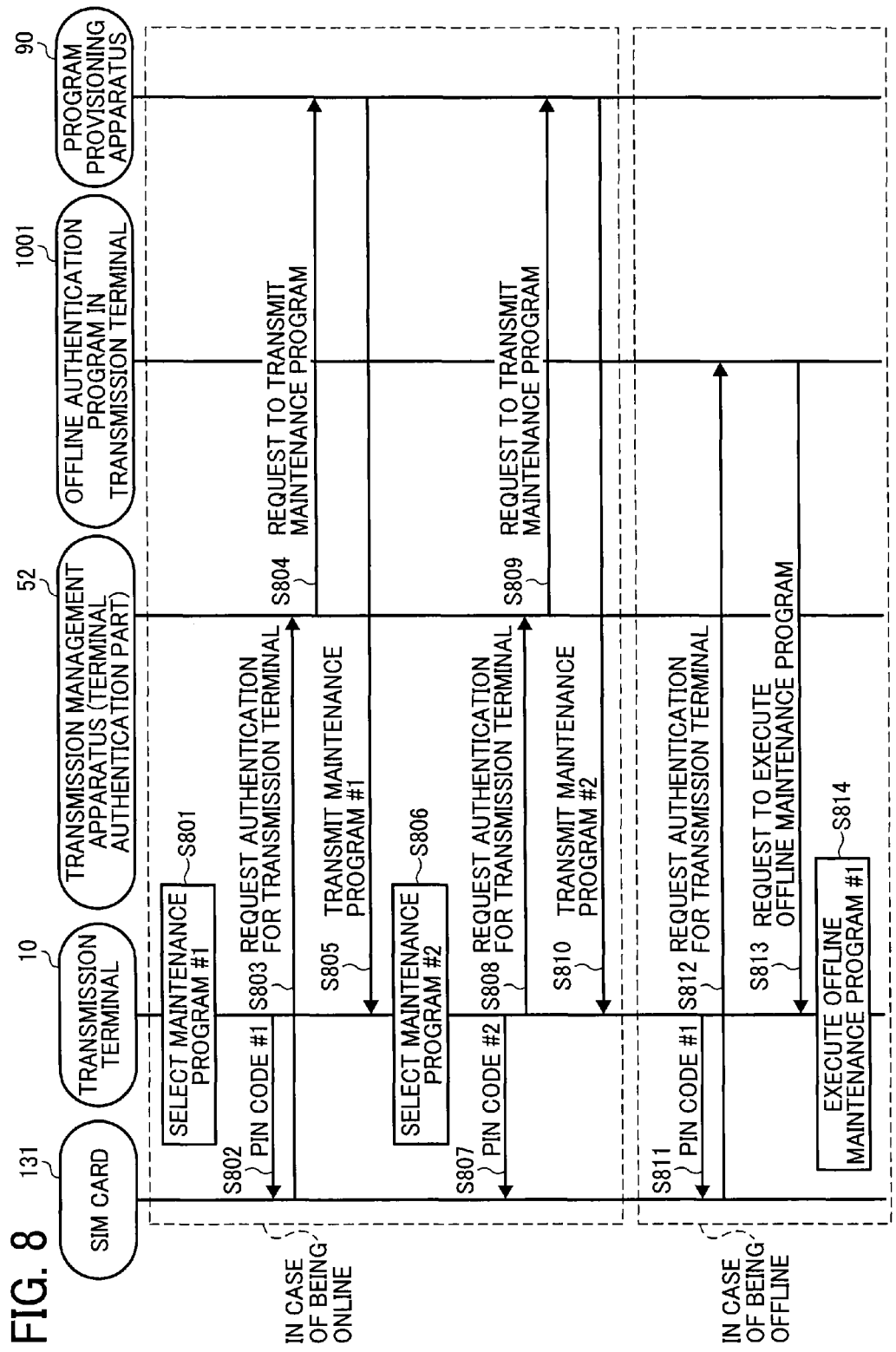

APPARATUS, METHOD, AND RECORDING MEDIUM OF INFORMATION PROCESSING

CROSS-REFERENCE TO RELATED APPLICATIONS

This patent application is based on and claims priority pursuant to 35 U.S.C. §119 to Japanese Patent Application No. 2014-025822, filed on Feb. 13, 2014 in the Japan Patent Office, the entire disclosure of which is hereby incorporated by reference herein.

BACKGROUND

Technical Field

Embodiments discussed herein relate to maintenance of an information processing apparatus.

Description of the Related Art

A remote conference system is known as one type of a transmitting system connected with a network. In such a remote conference system, a video distribution server distributes video data and sound data to respective transmission terminals.

SUMMARY

An information processing apparatus that includes a memory that stores a first software, a first connection interface that is connectable to a first medium for executing a first maintenance program to maintain the information processing apparatus, and a second connection interface that is connectable to a second medium, which stores a second maintenance program and a second software for executing the second maintenance program that provides at least one function which is different from a function provided by the first maintenance program. The information processing apparatus also includes processing circuitry that starts the second software stored in the second medium to execute the second maintenance program when a type of the first medium is a maintenance type, and starts the first software stored in the first medium to execute the first maintenance program when the type of the first medium is not the maintenance type, wherein the processing circuitry does not start the second software when the type of the first medium is not the maintenance type.

BRIEF DESCRIPTION OF THE DRAWINGS

FIG. 8 shows a sequence diagram illustrating PIN code authentication processing in the transmission system according to the present embodiment.

DETAILED DESCRIPTION

Below, using the drawings, embodiments of the present disclosure will be described in detail.

Figure 1:
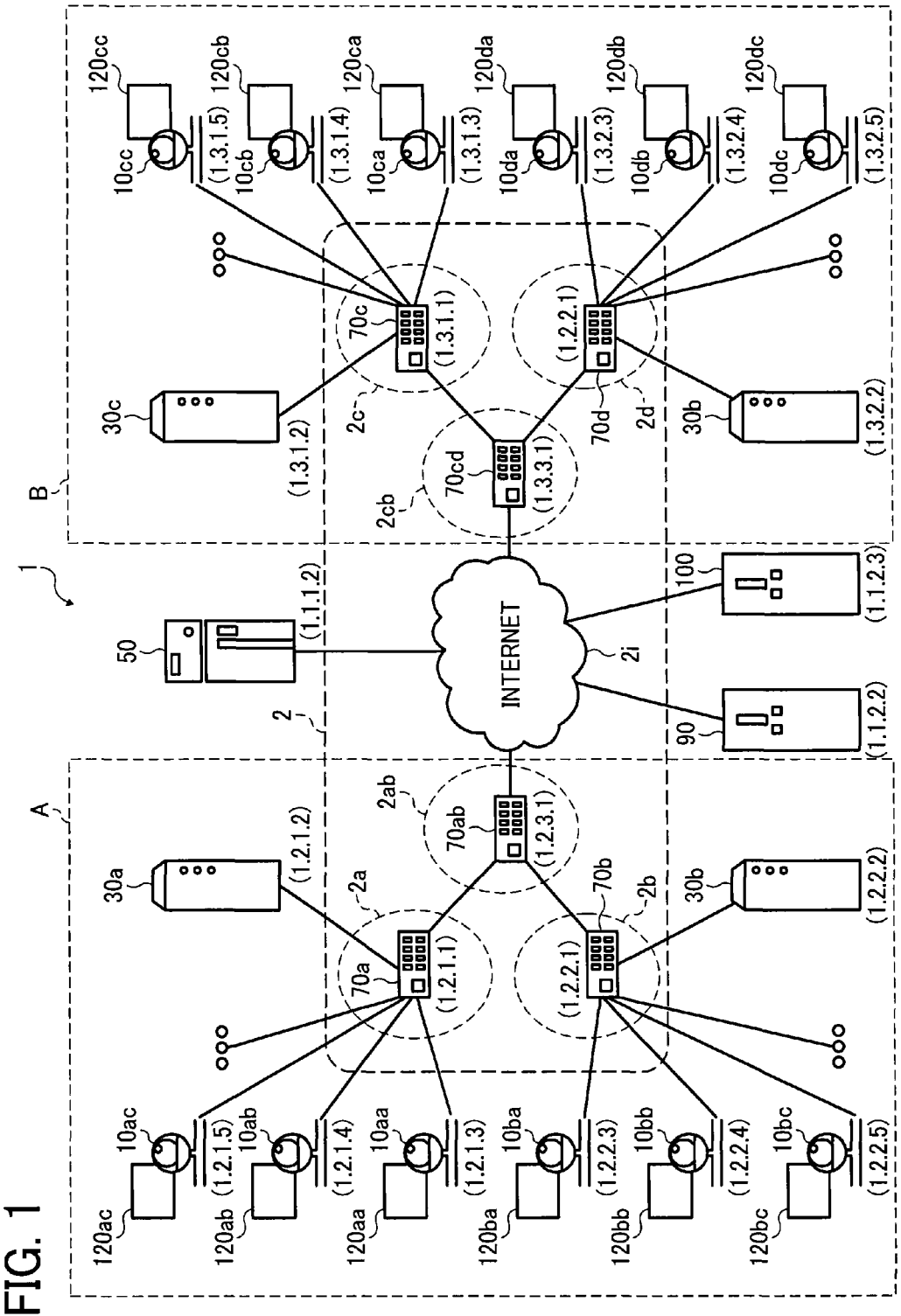
FIG. 1 shows a configuration example of a transmission system to which an information processing system according to the present embodiment is applied.

FIG. 1 shows a configuration example of a transmission system to which an information processing system according to the present embodiment is applied. The transmission system 1 according to the present embodiment, as in FIG. 1, includes a plurality of transmission terminals 10aa, 10ab, 10ac, 10ba, 10bb, 10bc, 10ca, 10cb, 10cc, 10da, 10db, 10dc, . . . (generalized herein as "10"), display devices 120aa, 120ab, 120ac, 120ba, 120bb, 120bc, 120ca, 120cb, 120cc, 120da, 120db, 120dc, . . . (generalized herein as "120") for the respective transmission terminals 10, a plurality of relay apparatuses 30a, 30b, 30c and 30d (generalized herein as "30"), a transmission management apparatus 50 as a transmission management system manages communication in the transmission system, a program provisioning apparatus 90 as a program provisioning system provides programs for each of the apparatuses in the transmission system 1, and a maintenance apparatus 100 as a maintenance system maintains the whole of the transmission system 1 (e.g. detecting a problem of communication network 2).

For example, the transmission terminal 10 (one example of an information apparatus) can be a smartphone, a tablet terminal, a cellular phone/portable phone, a personal computer, a meeting device, an interactive whiteboard, a projector, an industrial equipment, or an imaging forming apparatus. The transmission terminal 10 transmits and receives content data with another terminal. The content data includes image data and voice data captured by the transmission terminal 10 at the location that the transmission terminal 10 is installed. In the present embodiment, the site is area A or area B. Specifically, the transmission terminal 10 transmits and receives content data with another transmission terminal 10 via the relay apparatus 30 by establishing a communication by exchanging management information with the another transmission terminal 10 via the transmission management apparatus 50. Further, in the present embodiment, when the transmission terminal 10 transmits the image data as the content data to another transmission terminal 10 or receives the image data as the content data from another transmission terminal 10, the transmission terminal 10 can transmit or receive the image data by using a video coding standard such as H.264/Scalable Video Coding (SVC). Then, the transmission terminal 10 causes the display 120 to display the received image data (the content data). As a video coding standard, any of the known standards can be used, and is not limited to H.264/SVC. For example, H.264/Advanced Video Coding (AVC) can be used instead.

The relay apparatus 30 relays content data among a plurality of transmission terminals 10. The transmission management apparatus 50 monitors the current status of the communication network 2 by itself. The transmission management apparatus 50 authenticates a user who logged in from the transmission terminal 10, monitors the current communication status of content data, stores destination lists including destination information which indicates source or destination of content data, monitors the current relay status of content data in the relay apparatus 30, and so on.

A plurality of routers 70a, 70b, 70c, 70d, 70ab, and 70cd selects an optimum route of the content data that is transmitted and received among the plurality of routers and transfers content data transmitted from a transmission terminal 10 connected to the router via Local Area Network (LAN) to a transmission terminal 10 connected to another network.

The program provisioning apparatus 90 includes a Hard Disk Drive (HDD) storing a program for controlling a transmission terminal for causing the transmission terminal 10 to implement various functions. For example, the program for controlling a transmission terminal is a maintenance program for maintaining the transmission terminal 10. The program provisioning apparatus 90 can transmit the program for controlling a transmission terminal to the transmission terminal 10. Further, the provisioning apparatus 90 stores also a program for a relay apparatus for causing the relay apparatus 30 to implement various functions in the HDD and can transmit a program for a relay apparatus to the relay apparatus 30. Further, the provisioning apparatus 90 stores also a program for a transmission management apparatus for causing the transmission management apparatus 50 to implement various functions in the HDD and can transmit a program for a transmission management apparatus to the transmission management apparatus 50. Further, the provisioning apparatus 90 stores also a program for a maintenance apparatus for causing the maintenance apparatus 100 to implement various functions in the HDD and can transmit a program for a maintenance apparatus to the maintenance apparatus 100.

The transmission terminals 10aa, 10ab, 10ac and the router 70a are connected via LAN 2a to mutually perform communication for content data. Further, the transmission terminals 10ba, 10bb, 10bc and the router 70b are connected via LAN 2b to mutually perform communication for content data.

The LAN 2a and the LAN 2b are constructed within a predetermined area A and are connected to each other by a dedicated line 2ab including the router 70ab. For example, the predetermined area A is Japan, the LAN 2a is constructed within a business office in Tokyo, and the LAN 2b is constructed within a business office in Osaka.

Further, the transmission terminals 10ca, 10cb, 10cc and the router 70c are connected via LAN 2c to mutually perform communication for content data. Further, the transmission terminals 10da, 10db, 10dc and the router 70d are connected via LAN 2d to mutually perform communication for content data.

The LAN 2c and the LAN 2d are constructed within a predetermined area B and are connected to each other by a dedicated line 2cb including the router 70cd. For example, the predetermined area B is the United States of America (USA), the LAN 2c is constructed within a business office in New York, and the LAN 2d is constructed within a business office in Washington. The area A and the area B are connected to each other to perform communications through the routers 70ab and 70cd via the Internet 2i.

The relay apparatus 30 and the transmission management apparatus 50 and the program providing apparatus 90 are connected via the Internet 2i. The relay apparatus 30 and the transmission management apparatus 50 and the program providing apparatus 90 may be installed in the area A, the area B, or any other area.

In the present exemplary embodiment, the communication network 2 is constructed by the LAN 2a, the LAN 2b, the dedicated line 2ab, the Internet 2i, the dedicated line 2cb, the LAN 2c, and the LAN 2d. The communication network 2 is not limited to wire-line communication but may have a site where wireless communication such as wireless fidelity (Wi-Fi) or Bluetooth (a registered trademark) is performed.

In FIG. 1, the four-set numbers indicated below each transmission terminal 10, each relay apparatus 30, the management apparatus 50, each router 70, the program providing apparatus 90, and the maintenance apparatus 100 represent typical IP addresses in the IPv4. For example, the IP address of the terminal 10aa is "1.2.1.3." In the present embodiment, the IPv4 is one example of an internet protocol. The internet protocol is not limited to IPv4 but may be IPv6, and so on.

Each of the transmission terminals 10 may be used for a call in the same room, a call between the indoor and the outdoor, and a call between the outdoor and the outdoor as well as a call between a plurality of business offices and a call between different rooms within the same business office. When each of the transmission terminals 10 is used outdoor, wireless communication is performed through a cellular phone communication network.

Figure 2:
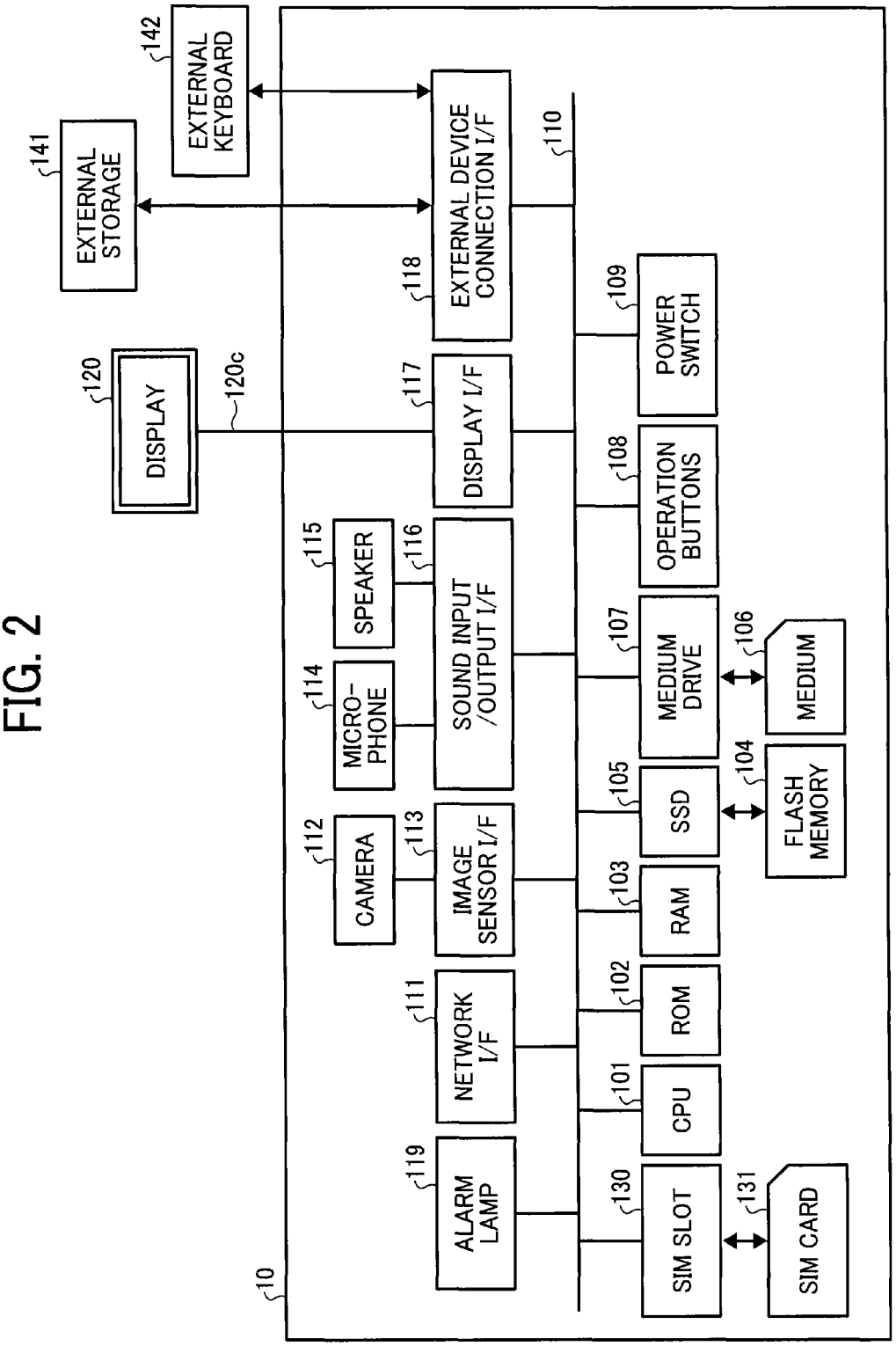
FIG. 2 shows a hardware configuration example of a transmission terminal in the transmission system according to the present embodiment.

FIG. 2 shows a hardware configuration example of the transmission terminal in the transmission system according to the present embodiment. In the present embodiment, the transmission terminal 10 includes a Central Processing Unit (CPU) 101 that controls the entirety of the transmission terminal 10, a Read-Only Memory (ROM) 102 storing programs (e.g. a program for controlling the transmission terminal including a maintenance program for offline, a first Operating System (OS) which is an OS as one example of a first executable software that can obtain a normal program for controlling the transmission terminal from the program provisioning apparatus 90 via the communication network 2 (one example of an external device) and execute the normal program) for driving the CPU 101 such as an Initial Program Loader (IPL), a Random Access Memory (RAM) 103 used as a work area for the CPU 101, a flash memory 104 storing various sorts of data such as the program for a terminal, video data and sound data and a Solid State Drive (SSD) 105 that controls, under the control of the CPU 101, reading and writing of various sorts of data on the flash memory 104, a medium drive 107 that controls reading and writing of data on a recording medium 106 such as a flash memory, operation buttons 108 operated by a user for selecting a destination of the transmission terminal 10, a power switch 109 for turning on and off the power in the transmission terminal 10, a network I/F 111 for transmitting data by using a communication network 2, and a detachable Subscriber Identity Module (SIM) slot 130 as a first connection part for accessing a SIM card 131 as a first medium to execute a maintenance program.

In the present embodiment, the SIM card 131 is one example of a first medium for executing the maintenance program. The first medium is not limited to the SIM card 131 but may be a Secure Digital (SD) Card, and so on. When the SD card is used as the first medium, an SD card slot is used as one example of the first connection.

Further, as shown in FIG. 2, the transmission terminal 10 includes a built-in-type camera 112 that images a subject under the control of the CPU 101 and obtains video data, an image sensor I/F 113 that controls driving of the camera 112, a microphone 114 for inputting sound, a built-in-type speaker 115 outputting sound and a sound input/output I/F 116 processing operations of inputting and outputting a sound signal under the control of the CPU 101 between the microphone 114 and the speaker 115, a display I/F 117 for transmitting video data to a display device 120 provided externally which is under the control of the CPU 101, a detachable external device connection I/F 118 (one example of a second connection part or one example of a third connection part) for connecting an external storage 141 (one example of a second medium) stored in a maintenance program and a second OS that is an OS as one example of a second executable software that can execute the maintenance program and an external keyboard 142 (one example of an external input part), an alarm lamp 119 indicating faults in various functions of the transmission terminal 10 and a bus line 110 such as an address bus, a data bus, and so forth for electrically connecting the above-mentioned respective elements.

The display device 120 includes a liquid crystal device or an organic Electro Luminescence (EL) for displaying a video image of a subject captured by the camera 112, an operation icon for operating the transmission terminal 10, and so forth. The display device 120 is connected to the display I/F 117 via a cable 120c. The cable 120c can be a cable for an analog RGB (VGA) signal, a cable for component video or a cable for a High-Definition Multimedia Interface (HDMI) (registered trademark) signal or a Digital Video Interactive (DVI) signal.

The camera 112 includes a lens and a solid-state image sensor that converts light into electric charge and obtains electronic image data from a video image of a subject. As the solid-state image sensor, a Complementary Metal Oxide Semiconductor (CMOS) device, a Charge Coupled Device (CCD) or the like can be used.

To the external device connection I/F 118, a camera to be provided externally, a microphone to be provided externally, a speaker to be provided externally or the like can be electrically connected via a Universal Serial Bus (USB) cable or the like. When a camera to be provided externally is connected, the camera to be provided externally is driven with priority to the built-in-type camera 112 under the control of the CPU 101. In the same way, when a microphone to be provided externally or a speaker to be provided externally is connected, a microphone to be provided externally or a speaker to be provided externally is driven with priority to the built-in microphone 114 or the built-in type speaker 115. To the external device connection I/F 118, an SD card or a USB memory can be connected.

Figure 3:
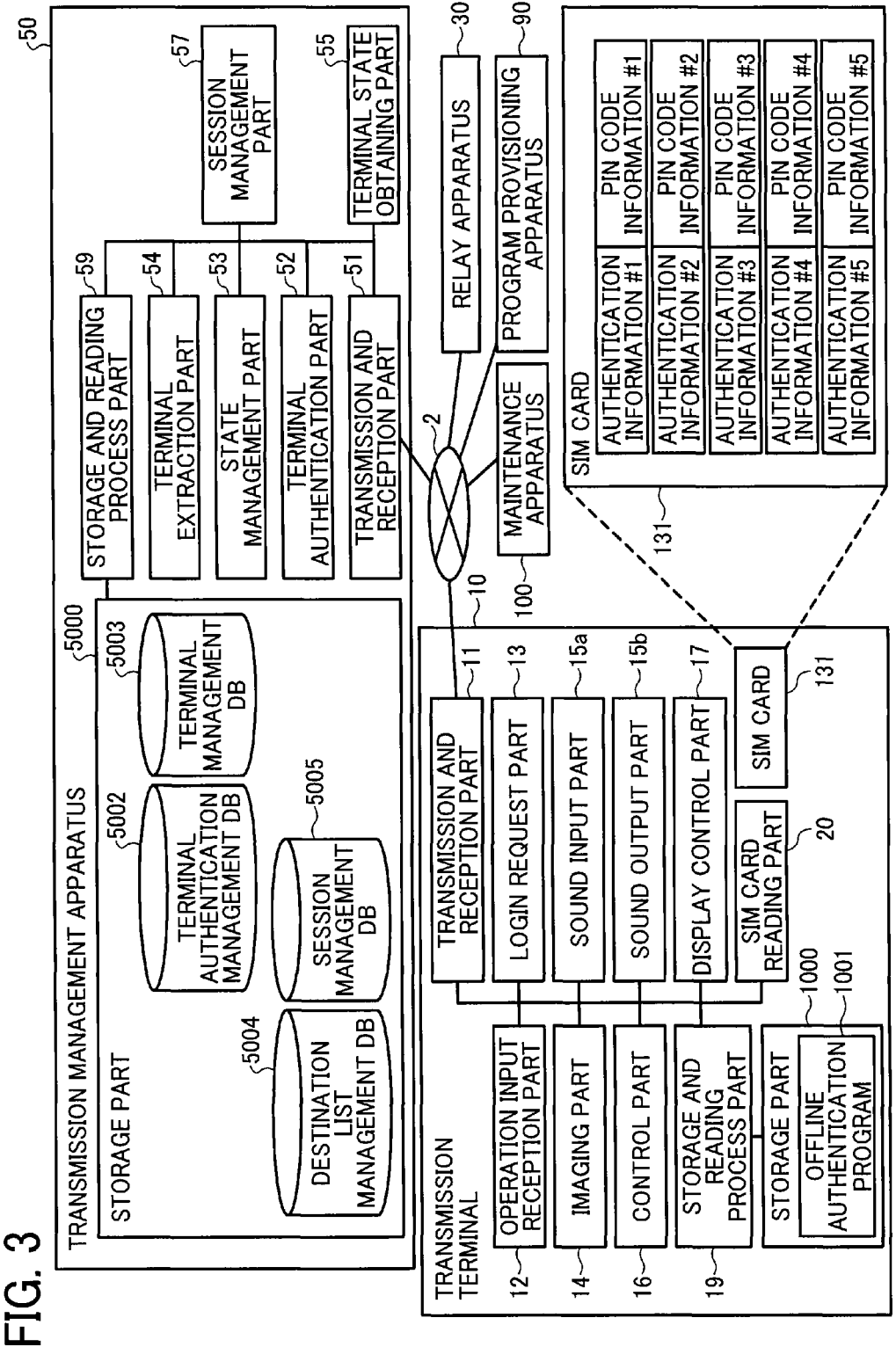
FIG. 3 shows a functional configuration example of the transmission system.

FIG. 3 shows a functional configuration example of the transmission system according to the present embodiment. In the present embodiment, the transmission terminal 10, as shown in FIG. 3, includes a transmission and reception part 11, an operation input reception part 12, a login request part 13, an imaging part 14, a sound input part 15a, a sound output part 15b, a control part 16, a display control part 17, a storage and reading process part 19, a SIM card reading part 20 and a storage part 1000. The storage part 1000 stores an offline authentication program 1001 which is executable to authenticate a user in case of the transmission terminal 10 being offline.

The transmission and reception part 11 is implemented by the network I/F 111 shown in FIG. 2 and transmits and receives various sorts of data with another transmission terminal 10, the relay apparatus 30, the transmission management apparatus 50, the program provisioning apparatus 90, the maintenance apparatus 100, or the external device via the communication network 2.

The operation input reception part 12 is implemented by the operation buttons 108 and the power switch 109 shown in FIG. 2 and receives various operation inputs from a user for operating the transmission terminal 10 or switching the power on and off.

The login request part 13 is implemented by the CPU 101 shown in FIG. 2 and automatically transmits, in response to the power being turned on, login request information requesting login and the current IP address of the transmission terminal 10 (the request source terminal) from the transmission and reception part 11 to the transmission management system 50 via the communication network 2. Note that it is also possible that the login request information is transmitted in response to, other than the power being turned on, a corresponding input given by a user to the operation input reception part 12 of the transmission terminal 10.

The imaging part 14 is implemented by the camera 112 and the image sensor I/F 113 shown in FIG. 2, and takes an image of a subject using the camera 112 and outputs image data thus taken by the camera 112.

The sound input part 15a is implemented by the microphone 114 and the sound input/output I/F 116 shown in FIG. 2. When the microphone 114 converts a user's voice into a sound signal, sound data of the sound signal is input into the inside of the transmission terminal 10.

The sound output part 15b is implemented by the speaker 115 and the sound input/output I/F 116 shown in FIG. 2. Sound data which is input from the sound input part 15a or sound based on sound data received from an external device by the transmission and reception part 11 is output to the speaker 115.

The control part 16 is implemented by the CPU 101 shown in FIG. 2 and carries out various sorts of programs stored in ROM 102 and so forth.

The display control part 17 is implemented by the display I/F 117 shown in FIG. 2 and carries out control to transmit video data to the display device 120 provided externally.

The storage and reading process part 19 is implemented by the SSD 105 and so forth shown in FIG. 2, and stores various sorts of data in the storage part 1000 including the flash memory 104 or reads various sorts of data stored in the storage part 1000. In the present embodiment, the storage part 1000 stores the authentication program for offline 1001 which executes authentication of the transmission terminal 10 to execute the maintenance program in the transmission terminal 10 when the transmission terminal 10 is offline.

The SIM card reading part 20 is implemented by the SIM slot 130 shown FIG. 2 and reads authentication information for authenticating the transmission terminal 10 from the SIM card in the SIM slot 130. In the present embodiment, SIM card 131 stores SIM card type information including identification information for determining whether the SIM card 131 is one for a general user or one for maintenance.

Further, the SIM card 131 for a general user stores authentication information for authenticating the transmission terminal 10. The authentication information includes terminal identification information for identification of the transmission terminals, passwords, and program identification information for identification of the maintenance program for a general user.

On the other hand, SIM card 131 for maintenance stores a plurality of sets of authentication information (e.g. authentication information 1-5) for the transmission terminal 10 to carry out authentication associated with Personal Identification Number (PIN) codes information (e.g. PIN codes information 1-5) as execution authentication information to be used for authentication when the maintenance program corresponding to the set of authentication information is executed. It is possible to access to the authentication information and PIN codes information by the SIM card reading part 20. The PIN codes are one example, and image information can be used instead.

Further, the authentication information stored in the SIM card 131 for maintenance includes terminal identification information for identification of the transmission terminals and program identification information for identification of the maintenance program for maintenance.

In the present embodiment, the authentication information stored in the SIM card 131 includes terminal identification information for identification of the transmission terminals. However, instead of the identification information of the transmission terminals, user identification information for identification of the users can be used. If the SIM card 131 is lost, it is possible to remotely invalidate the SIM card 131 by deleting the corresponding authentication information stored in the transmission management apparatus 50.

In case of being online, when the transmission terminal 10 executes a maintenance program, the transmission terminal 10 requests login to the transmission system 1 by sending the authentication information stored in the SIM card 131 to the transmission management apparatus 50 via the communication network 2. The transmission management apparatus 50 authenticates the transmission terminal 10 using the authentication information received from the transmission terminal 10.

On the other hand, in case of being offline, when the transmission terminal 10 executes a maintenance program, the transmission terminal 10 authenticates a user of the transmission terminal 10 using the authentication information read from the SIM card 131 and the authentication program for offline 1001 stored in the storage part 1000.

The transmission management apparatus 50 shown in FIG. 3 includes a transmission and reception part 51, a terminal authentication part 52, a state management part 53, a terminal extraction part 54, a terminal state obtaining part 55, a session management part 57, a storage and reading process part 59, and a storage part 5000.

In the storage part 5000, a terminal authentication management DB 5002, a terminal management DB 5003, a destination list management DB 5004, and a session management DB 5005 are provided. The authentication management DB 5002 stores the terminal identification information associated with passwords using authentication of the transmission terminal 10. The terminal management DB 5003 stores the terminal identification information associated with the operation state of the transmission terminal 10, a date and time when login request information is received by the transmission management apparatus 50, and the IP address of the transmission terminal 10.

The destination list management DB 5004 stores the terminal identification information associated with the terminal identification information for identifying candidates for a destination terminal. The session management DB 5005 stores session identification information for identifying a session (communication) established among the transmission terminals 10 associated with the terminal identification information requesting the session and the terminal identification information that received the request of the session.

The transmission and reception part 51 transmits and receives various data (or information) to and from another transmission terminal or the relay apparatus 90 or the maintenance apparatus 100 via the communication network 2.

The terminal authentication part 52 carries out terminal authentication by searching the terminal authentication management DB 5002 in the storage part 5000 using, as search keys, the terminal identification information and password included in authentication information received through the transmission and reception part 51 from the transmission terminal 10 and authenticating the transmission terminal 10 by determining whether the same terminal identification information and password are managed in the terminal authentication management DB 5002.

In order to manage the operation state of the transmission terminal 10 (e.g. online, offline, and so on) which logins to the transmission system 1, the state management part 53 associates the terminal identification information of the transmission terminal 10 which logins to the transmission system 1, the operation state of the transmission terminal 10 which logins, a date and time when the transmission management system 50 receives the login request information, and the IP address of the transmission terminal 10 which logins with each other, and stores them in the terminal management DB 5003 in the storage part 5000.

The terminal extraction part 54 extracts the terminal identification information of the another transmission terminal 10 which can communicate with the transmission terminal 10 which logins to the transmission system 1 by reading the terminal identification information of the another transmission terminal 10 which can communicate with the transmission terminal 10 by searching the destination list management DB 5004 using, as a search key, the terminal identification information of the transmission terminal 10 which logins to the transmission system 1.

The terminal state obtaining part 55 reads the operation state of the another terminal identification information extracted by the terminal extraction part 54 by searching the terminal management DB 5003 in the storage part 5000 by using, as a search key, the terminal identification information of the another transmission terminal 10 extracted by the terminal extraction part 54. Further, the terminal state obtaining part 55 makes the state available for establishing a session among the transmission terminal 10 and the another transmission terminal 10 by notifying the transmission terminal 10 which logins to the transmission system 1 of the IP address of the transmission terminal whose operation state is online.

In case of establishing a session among the transmission terminals, the session management part 57 associates the session identification information established, the terminal identification information of the session request transmission terminal 10, and the terminal identification information of the session received transmission terminal with each other, and stores them in the session management DB 5005.

The storage and reading process part 59 stores various data in the storage part 5000 and reads various data stored in the storage part 5000.

Figure 4:
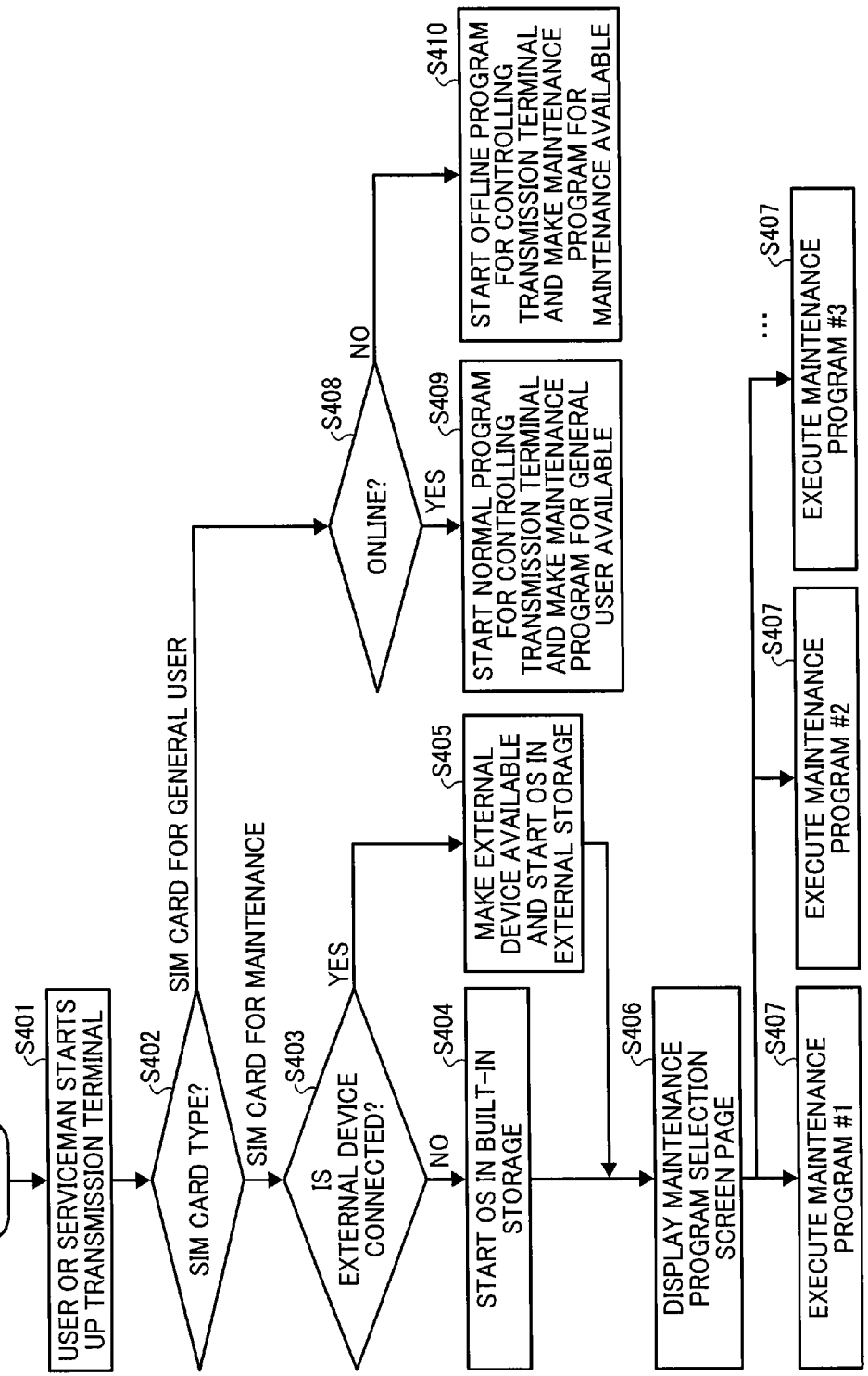
FIG. 4 shows a flowchart illustrating a maintenance program processing flow executed by the transmission terminal in the transmission system.

Next, execution processing of the maintenance program by the transmission terminal according to the present embodiment will be described in detail with reference to FIG. 4. FIG. 4 is a flowchart showing a flow of execution processing of the maintenance program by the transmission terminal in the transmission system 1 according to the present embodiment.

The control part 16 starts start processing of the transmission terminal 10 when the power switch 109 is turned on by a user or a serviceman of the transmission terminal 10 (step S401). In the present embodiment, in case of the transmission terminal 10 being used by a general user, the user can start the transmission terminal 10 by inserting the SIM card 131 for a general user into the SIM slot 130 and turning on the power switch 109. Further, in the present embodiment, in the case of the transmission terminal 10 being used by a serviceman, the serviceman can start the transmission terminal 10 by inserting the SIM card 131 for maintenance into the SIM slot 130 and turning on the power switch 109.

The control part 16 determines the type of SIM card 131 inserted into the SIM slot 130 (step S402). The control part 16 determines whether the SIM card 131 is a predetermined medium (in the present embodiment, a predetermined medium is the SIM card 131 for maintenance). In the present embodiment, the control part 16 determines whether the SIM card 131 is the SIM card for a general user or for maintenance based on the SIM card type information stored in the SIM card 131 inserted into the SIM slot 130.

For example, the control part 16, in case of not storing the SIM card type information in the SIM card 131, determines the SIM card 131 to be of a general user. On the other hand, the control part 16, in case of storing the SIM card type information in the SIM card 131, determines the SIM card 131 to be of a maintenance type. Further, when the SIM card type information indicates the type of a general user card, the control part 16 determines it as one that is not for maintenance, whereas, when the SIM card 131 type information indicates the type of maintenance, the control part 16 determines it as one for maintenance.

The control part 16, in a case of determining that the SIM card 131 is a SIM card for a general user (step S402: the SIM card for a general user), determines whether the transmission terminal 10 is online (step S408). In a case of determining online (step S408: Yes), the control part 16, by controlling the login request part 13, transmits the authentication information read from the SIM card 131 by the SIM card reading part 20 to the transmission management apparatus 50.

Further, the control part 16, when the authentication of the transmission terminal 10 by the transmission management apparatus 50 is successful, starts the first OS in ROM 102 and starts the normal program for controlling a transmission terminal 10 obtained from the program provisioning apparatus 90. The normal program for controlling a transmission terminal 10 includes the maintenance program for a general user indicated by program identification information included in the authentication information transmitted by the transmission terminal 10. Further, the control part 16 makes the maintenance program for a general user available (step S409).

On the other hand, in a case of determining offline (step S408: No), the control part 16 controls the storage and reading process part 19 and reads the offline authentication program 1001 from the storage part 1000. Further, the control part 16 authenticates the user of the transmission terminal 10 using the authentication information read from SIM card 131 by the SIM card reading part 20 and the offline authentication program 1001. The control part 16, when the user authentication is successful, starts the first OS in ROM 102 and starts the offline program for controlling a transmission terminal 10 stored in ROM 102. Further, the control part 16 makes the maintenance program included in the offline program for controlling a transmission terminal 10 available (step S410).

That is, in the present embodiment, in a case of determining that the SIM card 131 is not a SIM card for maintenance (as in S409 and S410), the control part 16 inhibits the second OS in the external storage 141 from starting by starting the first OS in the ROM 102. Thereby, a general user is not able to execute the maintenance program that has a high security level using the SIM card for a general user, thus improving safety and security.

Further, the maintenance program included in the offline program for controlling a transmission terminal 10, in comparison to the maintenance program included in the normal program for controlling a transmission terminal 10, is not able to provide functions that can be used only online (e.g. a function of determining whether a communication can be available between the transmission terminal 10 and the relay apparatus 30). Further, when the transmission terminal 10 is offline, the maintenance program included in the offline program makes a function that has a high security level unavailable because the transmission management apparatus 50 is not able to authenticate the transmission terminal 10.

At S402, when the control part 16 determines that the SIM card 131 inserted into the SIM slot 130 is a SIM card for maintenance (step 402: the SIM card for maintenance), the control part 16 determines whether the external device (the external storage 141) is connected to (inserted into) the external device connection I/F 118 or not (step S403). When the external storage 141 is not connected to the external device connection I/F 118 (step S403: No) (in other words, when the SIM card 131 is inserted into the SIM slot 130 and the external storage 141 is not connected to the external device connection I/F 118), the control part 16 starts the first OS in ROM 102 (built-in storage) (step S404).

On the other hand, when the external storage 141 is connected to the external device connection I/F 118 (step S403: Yes) (in other words, when the SIM card 131 is inserted into the SIM slot 130 and the external storage 141 is connected to the external device connection I/F 118), the control part 16 makes the external storage 141 available and starts the second OS in the external storage 141 (step S405). Then, the control part 16 allows operation input to the transmission terminal 10 by using the external keyboard 142. Thereby, when a serviceman maintains (performs maintenance on) the transmission terminal 10, the serviceman can operate the transmission terminal 10 using the external keyboard 142, thus improving operability of the transmission terminal 10 for maintenance.

After the first OS or the second OS is started, the control part 16 causes the display device 120 to display a maintenance program selection screen page capable of selecting the maintenance program that will be run via the display I/F 117 (step S406).

Figure 5:
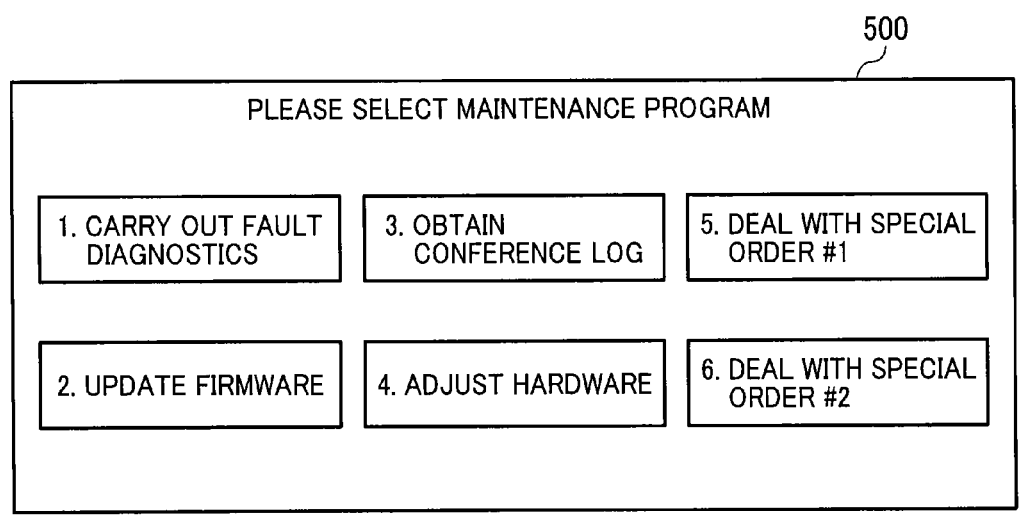
FIG. 5 shows one example of a maintenance program selection screen page displayed on a display of the transmission terminal according to the present embodiment.

FIG. 5 shows one example of the maintenance program selection screen page displayed in the transmission terminal 10 according to the present embodiment. In the present embodiment, when the control part 16 starts the first OS, the control part 16 causes the display device 120 to display the maintenance program selection screen page 500 displaying one or more names of programs (e.g. "1. CARRY OUT FAULT DIAGNOSTICS", "2. UPDATE FIRMWARE", "3. OBTAIN CONFERENCE LOG", "4. ADJUST HARDWARE", "5. DEAL WITH SPECIAL ORDER #1" and "6. DEAL WITH SPECIAL ORDER #2"). Note that each of the aforementioned represents one example of a maintenance program executable in the first OS.

Further, the control part 16 can change the selectable maintenance program according to whether the transmission terminal 10 is connected to the communication network 2 via a wire or wireless (e.g. a wired LAN or a wireless LAN). For example, a firmware update function having a relatively large size may require a wired LAN environment instead of a wireless LAN environment since a considerable time may be required to download it. In such cases, the control part 16 detects the connection state of the transmission terminal 10 and displays the maintenance program selection screen page 500 only when the currently connected network corresponds to a wired LAN environment. This improves performance efficiency of the maintenance program because a maintenance program that updates a relatively large size firmware can be selected only when the currently connected network corresponds to a wired LAN environment.

When the control part 16 starts the second OS, the control part 16 causes the display device 120 to display the maintenance program selection screen page 500 displaying a name (e.g. "1. CARRY OUT FAULT DIAGNOSTICS") of the maintenance program executable in the second OS that has been started (in other words, the maintenance program stored in the external storage 141).

Returning to FIG. 4, when the maintenance program is selected by the operation of the operation buttons 108 or the external keyboard 142, the control part 16 causes the selected maintenance program in the OS that has been started to execute (step S407). It is possible to execute a desired maintenance program because the user (or the serviceman) can select a desired maintenance program.

In the present embodiment, when the control part 16 carries out the maintenance program, the control part 16 requests the user to input, via a Graphical User Interface (GUI) displayed on the display device 120, a PIN code (one example of identification information capable of identifying a user) corresponding to the maintenance program. Further, the control part 16 allows the execution of the selected maintenance program when the input PIN code matches a predetermined PIN (one example of the predetermined identification information) code and the user authentication is successful. Further, the control part 16 does not allow the execution of the selected maintenance program when the input PIN code does not match a predetermined PIN code and the user authentication fails. Thus, it is possible to prevent the illegal execution of the maintenance program because the maintenance program is not executed when the invalid PIN code is input.

Further, the maintenance program that is executed at S407 is a program not necessary when a general user uses a remote conference function, and is a program whose operations cannot be guaranteed if a general user operates it, such as a function of updating the firmware or BIOS, a function of obtaining network communication quality concerning communication with the transmission management apparatus 50, a function of changing a non-compatible device to a compatible device, a function of tuning for a specific user or the like.

Further, usage of these maintenance programs can be limited depending on the skill of a serviceman. For the respective maintenance programs, PIN codes are assigned for allowing the corresponding maintenance program to be used. A method of managing the PIN codes is, for example, such that all the PIN codes are disclosed to a serviceman who is highly skilled in Information Technology (IT) and has received the proper security training. On the other hand, only predetermined PIN codes are disclosed to a serviceman who receives minimal training.

Figure 6:
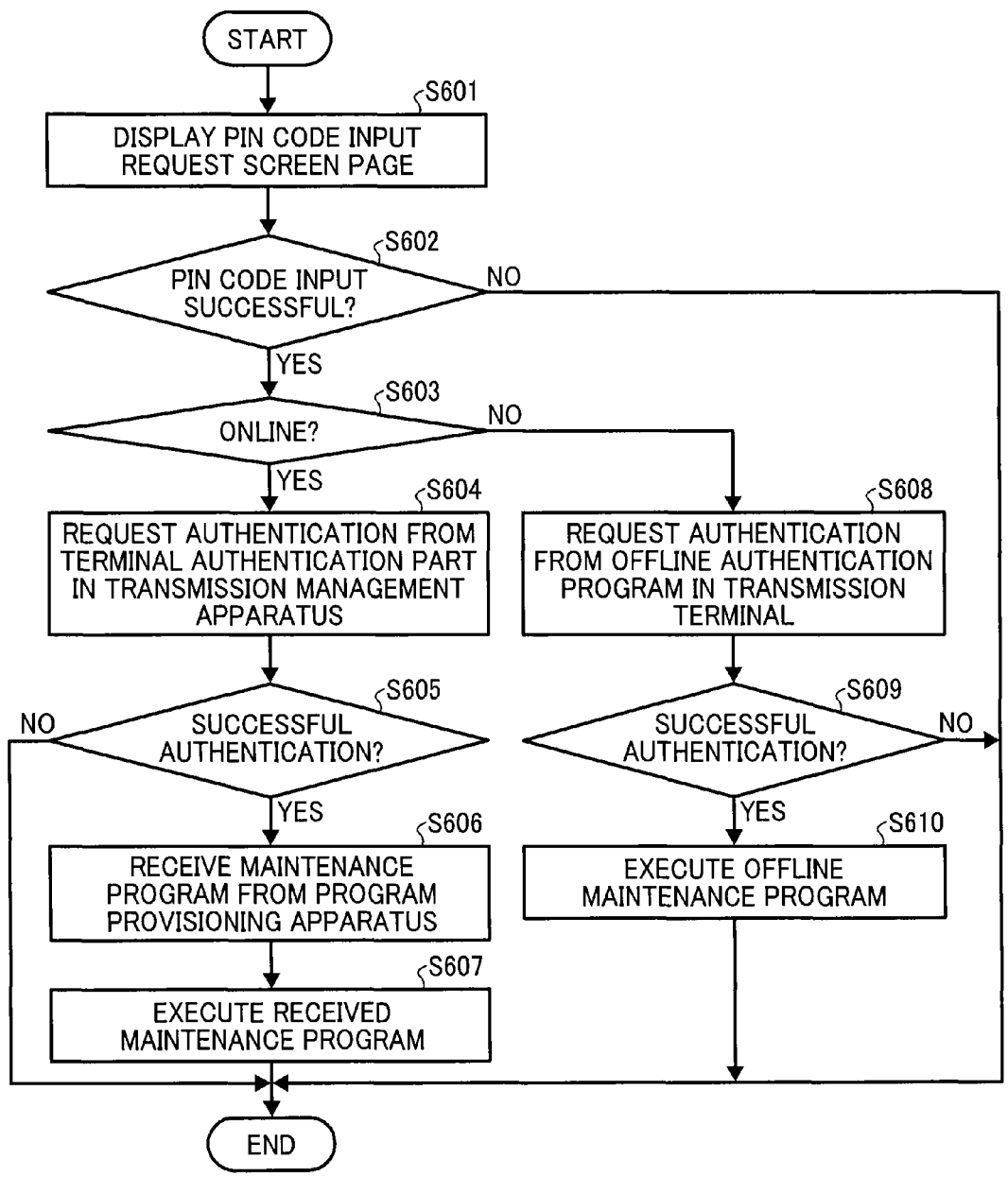
FIG. 6 shows a flowchart illustrating a maintenance program processing flow executed by the transmission terminal according to the present embodiment.

Next, execution processing of the maintenance program will be described in detail with reference to FIG. 6. FIG. 6 is a flowchart showing a flow of execution processing of the maintenance program by the transmission terminal according to the present embodiment.

In the present embodiment, the control part 16 causes the display device 120 to display the PIN code input screen page that requests a user to input the PIN code corresponding to the maintenance program (the available maintenance program, shown in FIGS. 4, at S409 and S410 or the selected maintenance program on the maintenance program selection screen page 500) that will be run (step S601).

Figure 7:
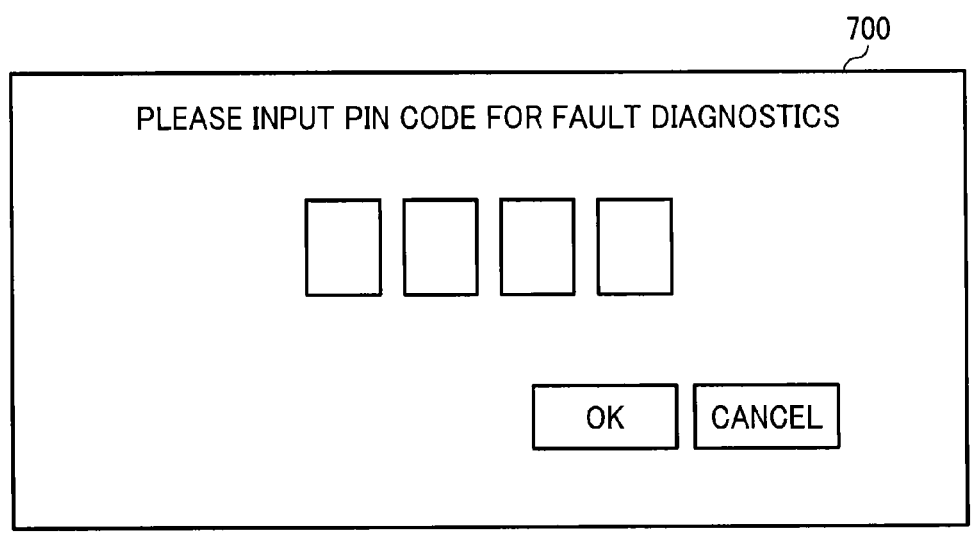
FIG. 7 shows one example of a PIN code input screen page displayed on the display of the transmission terminal according to the present embodiment.

FIG. 7 shows one example of the PIN code input screen page 700 displayed in the transmission terminal 10 according to the present embodiment. In the present embodiment, the control part 16 causes the display device 120 to display the PIN code input screen page 700 that is input (the PIN code having four digits) by a user, as is shown in FIG. 7. A serviceman of the transmission terminal 10 operates the operation buttons 108 or the external keyboard 142 and inputs the PIN code. After that, the serviceman can request for an authentication of the input PIN code by clicking on an OK button.

Note that the PIN code does not need to be a numeral or characters. Such an input of a numeral or characters using the external keyboard 142 requires the external keyboard 142 to be carried. On the other hand, a predetermined combination of a plurality of keys of the transmission terminal 10 can be stored as the PIN code. In this case, when a user turns on the power switch 109 in the transmission terminal 10 while pressing the predetermined combination of the plurality of keys on the transmission terminal 10, the transmission terminal 10 regards this operation as the PIN code of the plurality of keys being input (in other words, regards the user authentication as successful). It is possible that the transmission terminal 10 cancels the usage restriction of the maintenance program.

Further, after the control part 16 selects the maintenance program, when a user presses the predetermined combination of the plurality of keys on the operation buttons 108 of the transmission terminal 10, the control part 16 regards this operation as the PIN code of the plurality of keys being input. It is possible to improve operability of maintenance for the transmission terminal 10 because the maintenance program is executed without inputting the PIN code.

Returning to FIG. 6, the control part 16 determines whether the PIN code is input or not (step S602). When a predetermined time has passed without inputting the PIN code (step S602: No), the control part 16 cancels the execution of the maintenance program.

On the other hand, when the PIN code is input (step S602: Yes), the control part 16 determines whether the transmission terminal 10 is online or not (step S603). When the control part 16 determines that the transmission terminal 10 is online (step S603: Yes), the control part 16 requests the authentication of the transmission terminal 10 for the terminal authentication part 52 in the transmission management apparatus 50 using the authentication information corresponding to the input PIN code stored in the SIM card 131 inserted in the SIM slot 130 (step S604). Then, when the authentication of the transmission terminal 10 fails, the control part 16 cancels the execution of the maintenance program.

On the other hand, when the authentication of the transmission terminal 10 is successful by the terminal authentication part 52 and the starting OS at the processing shown in FIG. 4 is the first OS (step S605: Yes), the control part 16 receives (obtains) the maintenance program from the program provisioning apparatus 90 by a function of the first OS (step S606). Then, the control part 16 carries out the received maintenance program in the first OS (step S607). When the authentication of the transmission terminal 10 is successful by the terminal authentication part 52 and the starting OS at the processing shown in FIG. 4 is the second OS, the control part 16 obtains the maintenance program from the external storage 141 by a function of the second OS. Then, the control part 16 carries out the obtained maintenance program in the second OS.

At S603, when the transmission terminal 10 is offline (step S603: No), the control part 16 requests the authentication of the transmission terminal 10 for the authentication program for offline 1001 stored in the storage 1000 using the authentication information corresponding to the input PIN code stored in the SIM card 131 inserted in the SIM slot 130 (step S608).

When the authentication of the transmission terminal 10 fails by the authentication program for offline 1001 (step S609: No), the control part 16 cancels the execution of the maintenance program. On the other hand, when the authentication of the transmission terminal 10 is successful by the authentication program for offline 1001 and the starting OS at the processing shown in FIG. 4 is the first OS (step S609: Yes), the control part 16 reads the maintenance program for offline from the ROM 102 by a function of the first OS and executes the maintenance program for offline (step S610). When the authentication of the transmission terminal 10 is successful by the authentication program for offline 1001 and the starting OS at the processing shown in FIG. 4 is the second OS, the control part 16 obtains the maintenance program from the external storage 141 by a function of the second OS and executes the obtained maintenance program (step S610).

Next, authentication processing of the PIN code will be described in detail with reference to FIG. 8. FIG. 8 is a sequence diagram showing a flow of authentication processing of the PIN code in the transmission system according to the present embodiment.

When the maintenance program (e.g. the maintenance program #1) is selected at the maintenance program selection screen page 500 shown in FIG. 5 (step S801) or the maintenance program #1 is made available at S409 and S410, the control part 16 determines whether the transmission terminal 10 is online or not (FIG. 6, step S603). When the control part 16 determines that the transmission terminal 10 is online, the control part 16 reads the authentication information corresponding to the PIN code (e.g. the PIN code #1 corresponding to the maintenance program #1) input on the PIN code input screen page 700 from the SIM card 131 inserted in the SIM slot 130 (step S802). Then, the control part 16 requests the authentication of the transmission terminal 10 for the terminal authentication part 52 by sending the read authentication information to the transmission management apparatus 50 (step S803).

The terminal authentication part 52 in the transmission management apparatus 50 authenticates the transmission terminal 10 by determining whether the terminal identification information and the password including the received authentication information from the transmission terminal 10 matches the terminal identification information and the password stored in the terminal authentication management DB 5002 or not. Further, when the terminal identification information and the password included in the received authentication information matches the terminal identification information and the password stored in the terminal authentication management DB 5002 and the authentication of the transmission terminal 10 is successful, the terminal authentication part 52 requests to send the maintenance program identified by the program identification information included in the received authentication information to the transmission terminal 10 for the program provisioning apparatus 90 (step S804). In this regard, the terminal authentication part 52 sends the program identification information included in the received authentication information and information (e.g. IP address) for identifying the destination transmission terminal 10 of the maintenance program. Further, the terminal authentication part 52, referring to the terminal management DB 5003, identifies the IP address of the destination transmission terminal 10 of the maintenance program.

When the program provisioning apparatus 90 is requested to send the maintenance program from the terminal authentication part 52 in the transmission management apparatus 50, the program provisioning apparatus 90 sends the maintenance program (e.g. maintenance program #1) identified by the program identification information included in the authentication information to the transmission terminal 10 (step S805). On the other hand, when the maintenance program (e.g. the maintenance program #2) is selected at the maintenance program selection screen page 500 shown in FIG. 5 (step S806) or the maintenance program #2 is made available at S409 and S410, the control part 16 determines whether the transmission terminal 10 is online or not (FIG. 6, step S603). When the control part 16 determines that the transmission terminal 10 is online, the control part 16 reads the authentication information corresponding to the PIN code (e.g. the PIN code #2 corresponding to the maintenance program #2) input on the PIN code input screen page 700 from the SIM card 131 inserted in the SIM slot 130 (step S807). Then, the control part 16 requests the authentication of the transmission terminal 10 for the terminal authentication part 52 by sending the read authentication information to the transmission management apparatus 50 (step S808).

The terminal authentication part 52 in the transmission management apparatus 50 authenticates the transmission terminal 10 by determining whether the terminal identification information and the password included in the received authentication information from the transmission terminal 10 matches the terminal identification information and the password stored in the terminal authentication management DB 5002 or not. Further, when the terminal identification information and the password included in the received authentication information matches the terminal identification information and the password stored in the terminal authentication management DB 5002 and the authentication of the transmission terminal 10 is successful, the terminal authentication part 52 requests to send the maintenance program identified by the program identification information included in the received authentication information to the transmission terminal 10 for the program provisioning apparatus 90 (step S809). In this regard, the terminal authentication part 52 sends the program identification information included in the received authentication information and information (e.g. IP address) for identifying the destination transmission terminal 10 of the maintenance program. Further, the terminal authentication part 52, referring to the terminal management DB 5003, identifies the IP address of the destination transmission terminal 10 of the maintenance program.

When the program provisioning apparatus 90 is requested to send the maintenance program from the terminal authentication part 52 in the transmission management apparatus 50, the program provisioning apparatus 90 sends the maintenance program (e.g. maintenance program #2) identified by the program identification information included in the authentication information to the transmission terminal 10 (step S810).

On the other hand, when the control part 16 determines that the transmission terminal 10 is offline, the control part 16 reads the authentication information corresponding to the PIN code (e.g. the PIN code #1 corresponding to the maintenance program #1) input on the PIN code input screen page 700 from the SIM card 131 inserted in the SIM slot 130 (step S811). Then, the control part 16 requests the authentication of the transmission terminal 10 for the offline authentication program 1001 stored in the storage 1000 by sending the read authentication information to the offline authentication program 1001 (step S812).

The offline authentication program 1001 authenticates the transmission terminal 10 by determining whether the terminal identification information and the password included in the received authentication information matches the predetermined terminal identification information and the predetermined password or not. Further, when the terminal identification information and the password included in the received authentication information matches the predetermined terminal identification information and the predetermined password and the authentication of the transmission terminal 10 is successful, the offline authentication program 1001 requests to execute the maintenance program identified by the program identification information included in the received authentication information for the control part 16 (step S813).

The control part 16 obtains the maintenance program (e.g. the maintenance program #1) from the ROM 102 or the external storage 141. After that, the control part 16 executes the obtained maintenance program (step S814).

As described above, in the transmission system 1 according to the present embodiment, even when the transmission terminal 10 is not able to connect with the communication network 2, a user is able to execute the maintenance program that is larger than the size of memory in the SIM card 131, thus improving safety on security of a maintenance function using a single SIM card 131 without depending on a network environment of the transmission terminal 10. In another aspect, even when failure occurs in the built-in storage of the transmission terminal 10 (ROM 102), a user is able to execute the maintenance program using the second OS stored in the external storage 141 and to identify a cause of the failure of the transmission terminal 10.

Note that, the present invention is not limited to the specifically disclosed embodiment(s). Further, the transmission management apparatus 50, the provisioning program apparatus 90, the maintenance apparatus 100 or another external device is able to have the function of the control part 16 instead of the transmission terminal 10. Further, a plurality of external devices is able to have a function of the control part 16.

Further, the system configuration that the transmission terminal 10, the transmission management apparatus 50, the program provisioning apparatus 90, and the maintenance apparatus 100 are connected according to the present embodiment is one example, the system configuration can be changed based on usage or purpose.

The program executed in the transmission terminal 10 according to the present embodiment may be written onto a recording medium that is readable by a general-purpose computer such as the recording medium or the CD-ROM in any format that is installable or executable by the general-purpose computer. Further, the program may be stored in any desired memory other than the HD, such as the ROM. Other examples of removable recording medium, which may be used instead of the CD-ROM include, but are not limited to, compact disc recordable (CD-R), digital versatile disk (DVD), flexible disk (FD), and blu-ray disc.

Further, once the program executed in the transmission terminal 10 according to the present embodiment is written onto the recording medium in a computer connected to network (e.g. internet), the program may be provided by downloading via the network. Further, the program executed in the transmission terminal 10 according to the present embodiment may be distributed or provided via the network.

What is claimed is:

1. An information processing apparatus, comprising:
   a memory that stores first software;
   a Subscriber Identity Module (SIM) slot that is connectable with a SIM card for executing a first maintenance program to maintain the information processing apparatus;
   an external storage device connection interface that is connectable with an external storage device, which is external to the information processing apparatus and which stores a second maintenance program and second software for executing the second maintenance program that provides at least one function which is different from a function provided by the first maintenance program; and
   processing circuitry that
      determines a type of SIM card inserted into the SIM slot,
      starts the second software stored in the external storage device to execute the second maintenance program when the type of the SIM card is a maintenance type,
      makes the external storage device available and starts the second software in the external storage when the type of the SIM card is the maintenance type and the external storage device is connected to the external storage device connection interface,
      starts the first software in an internal storage when the type of the SIM card is the maintenance type and the external storage device is not connected to the external storage device connection interface, and
      starts the first software stored in the SIM card to execute the first maintenance program when the type of the SIM card is not the maintenance type, wherein
   the processing circuitry does not start the second software when the type of the SIM card is not the maintenance type,
   the processing circuitry causes a display device of the information processing apparatus to display a selection screen page to select at least one maintenance program, and
   the processing circuitry changes the least one maintenance program displayed on the selection screen page based on whether the information processing apparatus is connected to the external storage device via a wire.

2. The information processing apparatus of claim 1, further comprising:
   an input device interface that is connectable with an external input device, which is external to the information processing apparatus, wherein
   the processing circuitry starts the second software by operating the external input device when the type of the SIM card is the maintenance type.

3. The information processing apparatus of claim 1, wherein
   the first software or the second software executes the selected maintenance program.

4. The information processing apparatus of claim 3, wherein the processing circuitry allows execution of the selected maintenance program when a user authentication is successful using identification information input by a user, and does not allow execution of the selected maintenance program when the user authentication is not successful.

5. The information processing apparatus of claim 4, wherein the processing circuitry allows execution of the selected maintenance program when a user turns on a power switch in the information processing apparatus while pressing a predetermined combination of the plurality of keys on the information processing apparatus.

6. The information processing apparatus of claim 4, wherein the processing circuitry allows execution of the selected maintenance program when a user presses a predetermined combination of the plurality of keys on operation buttons of the information processing apparatus.

7. The information processing apparatus of claim 1, wherein the processing circuitry inhibits the second software from starting when the type of the SIM card is not the maintenance type.

8. A method of information processing, comprising:
    storing first software in a memory of an information processing apparatus, the information processing apparatus including a Subscriber Identity Module (SIM) slot that is connectable with a SIM card for executing a first maintenance program to maintain the information processing apparatus and an external storage device connection interface that is connectable with an external storage device, which is external to the information processing apparatus and which stores a second maintenance program and second software for executing the second maintenance program that provides at least one function which is different from a function provided by the first maintenance program;
    determining a type of SIM card inserted into the SIM slot;
    starting the second software stored in the external storage device to execute the second maintenance program when the type of the SIM card is a maintenance type;
    making the external storage device available and starting the second software in the external storage when the type of the SIM card is the maintenance type and the external storage device is connected to the external storage device connection interface;
    starting the first software in an internal storage when the type of the SIM card is the maintenance type and the external storage device is not connected to the external storage device connection interface;
    starting the first software stored in the SIM card to execute the first maintenance program when the type of the SIM card is not the maintenance type, and not starting the second software when the type of the SIM card is not the maintenance type;
    causing a display device of the information processing apparatus to display a selection screen page to select at least one maintenance program; and
    changing the least one maintenance program displayed on the selection screen page based on whether the information processing apparatus is connected to the external storage device via a wire.

9. A non-transitory recording medium storing a plurality of instructions which, when executed by a processor, cause the processor to perform a method of information processing, the method comprising:
    storing first software in a memory of an information processing apparatus, the information processing apparatus including a Subscriber Identity Module (SIM) slot that is connectable with a SIM card for executing a first maintenance program to maintain the information processing apparatus and an external storage device connection interface that is connectable with an external storage device, which is external to the information processing apparatus and which stores a second maintenance program and second software for executing the second maintenance program that provides at least one function which is different from a function provided by the first maintenance program;
    determining a type of SIM card inserted into the SIM slot;
    starting the second software stored in the external storage device to execute the second maintenance program when the type of the SIM card is a maintenance type;
    making the external storage device available and starting the second software in the external storage when the type of the SIM card is the maintenance type and the external storage device is connected to the external storage device connection interface;
    starting the first software in an internal storage when the type of the SIM card is the maintenance type and the external storage device is not connected to the external storage device connection interface;
    starting the first software stored in the SIM card to execute the first maintenance program when the type of the SIM card is not the maintenance type, and not starting the second software when the type of the SIM card is not the maintenance type;
    causing a display device of the information processing apparatus to display a selection screen page to select at least one maintenance program; and
    changing the least one maintenance program displayed on the selection screen page based on whether the information processing apparatus is connected to the external storage device via a wire.

* * * * *